(12) United States Patent
Matsumoto et al.

(10) Patent No.: US 8,517,714 B2
(45) Date of Patent: Aug. 27, 2013

(54) SHEET FORMING DEVICE

(75) Inventors: Shinichi Matsumoto, Sanda (JP);
Makoto Irie, Sanda (JP); Shigeto Saiuchi, Sanda (JP)

(73) Assignee: Moriyama Company Ltd., Hyogo (JP)

( * ) Notice: Subject to any disclaimer, the term of this patent is extended or adjusted under 35 U.S.C. 154(b) by 252 days.

(21) Appl. No.: 12/995,791

(22) PCT Filed: Oct. 31, 2008

(86) PCT No.: PCT/JP2008/069964
§ 371 (c)(1),
(2), (4) Date: Dec. 2, 2010

(87) PCT Pub. No.: WO2009/147756
PCT Pub. Date: Dec. 10, 2009

(65) Prior Publication Data
US 2011/0123659 A1    May 26, 2011

(30) Foreign Application Priority Data

Jun. 5, 2008 (JP) ................................. 2008-147782
Oct. 1, 2008 (JP) ................................. 2008-256863

(51) Int. Cl.
*B29C 43/34* (2006.01)
(52) U.S. Cl.
USPC ........................................................ 425/367
(58) Field of Classification Search
CPC .............................. B29C 43/245; B29C 43/34
USPC ........................................................... 425/367
See application file for complete search history.

(56) References Cited

U.S. PATENT DOCUMENTS

| 4,810,179 A | * | 3/1989 | Cavanagh | 425/141 |
| 5,817,346 A | * | 10/1998 | Nakano | 425/186 |

FOREIGN PATENT DOCUMENTS

| JP | 62211114 A | | 9/1987 |
| JP | 242331 B2 | | 9/1990 |
| JP | 05104607 A | | 4/1993 |
| JP | 2006231582 A | * | 9/2006 |
| JP | 2006231872 A | | 9/2006 |

* cited by examiner

*Primary Examiner* — Yogendra Gupta
*Assistant Examiner* — Alison Hindenlang
(74) *Attorney, Agent, or Firm* — The Webb Law Firm

(57) ABSTRACT

In a sheet forming device having a supplying unit (1) for extruding an amount of plastically deformable material (W), a storing unit (3) for temporally storing the material (W) extruded from the supplying unit (1), and a rolling unit (2) for rolling the material (W) stored in the storing unit (3) into a sheet form, the device comprises a pressing mechanism (4) for pressing the material (W) stored in the storing unit (3) from the upper side thereof with a preset pressure, wherein a pressing member (41) constituting the pressing mechanism (4) has a pressing face (41a) whose area is set to from 30 to 95% of the area of an upper opening portion (31) of the storing unit (3).

9 Claims, 8 Drawing Sheets

SHEET FORMING DEVICE

TECHNICAL FIELD

The present invention relates to a sheet forming device, more particularly to a sheet forming device configured to form, into a sheet form, a plastically deformable material such as rubber, resin, etc. (may be referred to simply as "material" hereinafter).

BACKGROUND ART

Conventionally, there is known a sheet forming device configured to extrude an amount of material kneaded by a kneading machine of a double tapered screw type acting as a supplying unit and to roll the extruded material into a sheet form, with a rolling unit having two rolls (see e.g. Patent Documents 1 and 2).

The sheet forming device of the above noted type includes a supplying unit, a storing unit and a rolling unit. In operation, an amount of material is extruded from the supplying unit to the storing unit, in which the extruded material is stored for a while. Thereafter, the material is transferred to the rolling unit to be formed into a sheet of material having a planned formed sheet thickness (see e.g. Patent Document 3).

Of the above, in the sheet forming device disclosed in Patent Document 1, between the supplying unit constituted of an extruding machine of two tapered screw type and the rolling unit comprised of two rolls, there is provided a storing unit for temporarily storing the amount of material supplied from the supplying unit. Then, this material stored in the storing unit is sent sequentially to the rolling unit to be formed into the sheet form.

In the meantime, the storing unit of the above-described sheet forming device is a so-called "open bank type" storing unit having an open top. With this type of sheet forming device, the device provides a difference absorbing function according to which when any difference has occurred between the receiving amount of the material from the supplying unit (the supplying amount by the supplying unit) and the feeding amount of the material fed to the rolling unit (the paying-out amount by the rolling unit), this difference is absorbed by increase/decrease in the amount of material stored inside the storing unit. On the other hand, however, in association with such variation in the supplying amount by the supplying unit, there tends to occur change in the pressure in the material being fed to the rolling unit, which change results in variation in the nipping (rolling) amount of the material in the rolling unit. This variation may result in such problems as disturbance in the shape of the formed sheet at its opposed ends and irregularity in the thickness thereof.

In an attempt to solve the above problem, as in the case of the sheet forming device disclosed in Patent Document 2, the art has proposed to detect the amount of material stored in the storing unit so that depending on this detected amount, the receiving amount of the material from the supplying unit may be controlled. However, with such controlling of the material stored in the storing unit alone, it has been proven difficult to eliminate the variation in the nipping amount due to the variation in the pressure of the material being fed to the rolling unit.

On the other hand, as described in Patent Document 3, the art has provided also the so-called "closed bank type" sheet forming device with the top of the storing unit thereof being closed. However, in the case of material having elasticity, there occurs a pressure distribution (irregularity of the magnitude of pressure according to the position) in the pressure applied to the elastic material stored in the storing unit. Hence, even if the receiving amount of the elastic material from the supplying unit is controlled based on detected value of the pressure applied to the elastic material at a particular position, it has been difficult to eliminate the variation in the nipping amount due to the variation in the pressure of the material to the rolling unit.

Also, in the case of the closed bank type sheet forming device, this type of device does not provide sufficiently such difference absorbing function for absorbing any difference which may have occurred between the receiving amount of the elastic material from the supplying unit and the feeding amount of the elastic material fed to the rolling unit. Therefore, if there develops a sharp buildup in the inside pressure of the storing unit due to e.g. response performance of the control mechanism for the supplying unit, this applies significant load to the constituting members of the supplying unit and/or the rolling unit, thus inviting damage to the device.

Moreover, in the case of the closed bank type sheet forming device, for effecting inspection, cleaning of its storing unit, the device needs to be disassembled, thus requiring much trouble.

Further, conventionally, the material charged into the supplying unit is kneaded in advance by a kneading machine. However, if there occurs a problem or deficiency in the kneading operation and/or inappropriateness of the kneading temperature, there may occur deficiency in the plasticization, which results in turn in formation of hard portions, which in turn leads to application of an excessive load to the rolling unit or failure to nip the material due to slippage of the material, thus leading to failure in rolling of the material in the rolling unit or clogging of the material in the rolling unit.

Moreover, such trouble in the sheet forming device may cause a trouble in a device operation-wise subsequent thereto, so that the entire sheet forming device needs to be temporarily stopped in its operation. Then, the material stored in the storing unit is hardened, so that when the operation is resumed, material clogging may occur in the rolling unit.

In the event of occurrence of such trouble as above, it was required that the operation of the entire device be stopped and the clogged material be removed from the storing unit.

That is, with these conventional solutions, the solutions required too much trouble and also, while the device is stopped, there occurs change in the viscosity of the material which change increases the viscosity, which makes the removal of the clogged material even more difficult to the disadvantage of the solution of the trouble.

Patent Document 1: Japanese Published Patent No. Hei. 2-42331
Patent Document 2: Japanese Patent Application "Kokai" No. Hei. 5-104607
Patent Document 3: Japanese Patent Application "Kokai" No. 2006-231582 (paragraph 0044).

DISCLOSURE OF THE INVENTION

In view of the problems present in the conventional sheet forming devices, an object of the present invention is to provide a sheet forming device capable of forming high-quality sheet with high dimensional precision and with regularity of the shape with elimination of variation in the feeding mount of the material to the rolling unit and capable also of absorbing sudden change in the inside pressure of the storing unit.

Another object of the present invention is to provide a sheet forming device that allows inspection and cleaning of the storing unit to be carried out easily.

Still another object of the present invention is to provide a sheet forming device that can solve the trouble in a more speedy manner.

According to the first characterizing feature of the present invention, in a sheet forming device having a supplying unit for extruding an amount of plastically deformable material, a storing unit for temporally storing the material extruded from the supplying unit, and a rolling unit for rolling the material stored in the storing unit into a sheet form, wherein the device comprises a pressing mechanism for pressing the material stored in the storing unit from the upper side thereof with a preset pressure, and wherein a pressing member constituting the pressing mechanism has a pressing face whose area is set to from 30 to 95% of the area of an upper opening portion of the storing unit.

With the sheet forming device according to the present invention, a pressing mechanism is provided for pressing the material stored in the storing unit from the upper side thereof with a preset pressure. With this, the material can be fed in a stable manner to the rolling unit while the pressing mechanism is applying a pressure to the material stored in the storing unit, whereby variation in the feeding amount of the material to the rolling unit can be eliminated. This allows forming of high-quality sheet with high dimensional precision and with greater regularity of shape.

And, with application of a predetermined pressure to the material stored in the storing unit by the pressing mechanism, even when e.g. the material supplying amount by the supplying unit is too large relative to the material paying-out amount by the rolling unit, as the pressing member will move upward thereby to increase the capacity of the storing unit, excessive rise in the inside pressure of the storing unit can be restricted. When the material supplying amount to the storing unit further increases, the pressing member will move further up to the opening end of the upper opening portion of the storing unit, thus rendering the storing unit into an open bank condition with its top portion being substantially open to allow discharge of the material to the outside of the storing unit. With this, accident such as damage to the device can be prevented.

Further, as the material can be fed in a stable manner to the rolling unit, even in the case of a type of material difficult to be nipped by the rolling unit, this material too can be caused to be nipped appropriately by the rolling unit without slippage.

Also, with the setting of the area of the pressing face of the pressing member constituting the pressing mechanism to from 30 to 95% of the area of an upper opening portion of the storing unit, it becomes possible to cause the storing unit to fully provide the difference absorbing function of the open bank type device having the open top, whereby any difference between the receiving amount of the material from the supplying unit and the feeding amount of the material to the rolling unit can be effectively absorbed, thus preventing sudden change in the inside pressure of the storing unit. As a result, it becomes possible to avoid application of excessive load to the constituting components such as the supplying unit and the rolling unit, thus avoiding subsequent damage to the device.

According to the second characterizing feature of the present invention, said pressing mechanism includes the pressing member, an actuator for applying the preset pressure to the material stored in the storing unit from the pressing face of the pressing member, and a link mechanism for transmitting a force of the actuator to the pressing member.

With the above-described sheet forming device according to the present invention, as the pressing mechanism includes the pressing member, an actuator for applying the preset pressure to the material stored in the storing unit from the pressing face of the pressing member, and a link mechanism for transmitting a force of the actuator to the pressing member, the pressing mechanism can be easily disassembled at the position of its link mechanism or at the position of the pressing member. As a result, inspection and cleaning of the storing unit can be carried out easily.

Further, when the material supplying amount by the supplying unit has become too large compared to the material paying-out amount by the rolling unit, the link mechanism causes the pressing member to move upward to the open end of the upper opening portion of the storing unit, thus automatically realizing the open bank condition of the storing unit with its top substantially opened, thus allowing discharge of the material to the outside of the storing unit. As a result, such accident as damage to the device can be avoided.

According to the third characterizing feature of the present invention, there is provided an operation controlling means for controlling the supplying amount of the material by the supplying unit and/or the paying-out amount of the material by the rolling unit, depending on the position of the pressing face of the pressing member.

With the above-described sheet forming device according to the present invention, as there is provided an operation controlling means for controlling the supplying amount of the material by the supplying unit and/or the paying-out amount of the material by the rolling unit, depending on the position of the pressing face of the pressing member, the amount of the material stored in the storing unit can be maintained at a predetermined amount, thus allowing forming of high-quality sheet with even higher shape regularity and even higher dimensional precision.

According to the fourth characterizing feature of the present invention, said operation controlling means sets the material supplying amount by the supplying unit to a high supplying amount greater than a rated supplying amount before driving the rolling unit; and said operation controlling means starts driving of the rolling unit when the position of the pressing face of the pressing member has risen and sets the material supplying amount to the rated supplying amount.

With the above-described sheet forming device according to the present invention, said operation controlling means sets the material supplying amount by the supplying unit to a high supplying amount greater than a rated supplying amount before driving the rolling unit; and said operation controlling means starts driving of the rolling unit when the position of the pressing face of the pressing member has risen and sets the material supplying amount to the rated supplying amount. Therefore, when the operation of the sheet forming device is to be started, the material supplying amount by the supplying unit is set to the high supplying amount with the drive of the rolling unit being stopped. Hence, the material can be charged speedily to the storing unit which is empty. Further, complete charging of the material to the storing unit can be detected based on rise in the position of the pressing face of the pressing member. Then, as the driving of the rolling unit is started upon this detection, high-quality sheet product can be extruded from the initial stage of the device operation.

According to the fifth characterizing feature of the present invention, there is provided a pressure controlling means configured to maintain the pressure of the pressing mechanism to a low pressure which enhances the rising responsiveness of the pressing member before driving of the rolling unit and to maintain said pressure to a predetermined pressure after the driving of the rolling unit.

With the above-described sheet forming device according to the present invention, there is provided a pressure controlling means configured to maintain the pressure of the pressing mechanism to a low pressure which enhances the rising responsiveness of the pressing member before driving of the rolling unit and to maintain said pressure to a predetermined pressure after the driving of the rolling unit. Therefore, it becomes possible to ensure the rising movement of the pressing member by the material supplied at the initial stage of the operation, and the control of the supplying amount of the material by the operation controlling means can be made more reliable, thus preventing damage to e.g. the rolling unit due to excessive supplying before driving.

According to the sixth characterizing feature of the present invention, a side wall of the storing unit is movable in the approaching/departing direction and the pressing member is expandable and contractible along the direction of the width thereof.

With the above-described sheet forming device according to the present invention, as a side wall of the storing unit is movable in the approaching/departing direction and the pressing member is expandable and contractible along the direction of the width thereof, it becomes possible to extrude sheets of various width sizes.

According to the seventh characterizing feature of the present invention, the material pressed by the pressing member is supported by a lower roll of two rolls together constituting the rolling unit.

With the above-described sheet forming device according to the present invention, as the material pressed by the pressing member is supported by a lower roll, the nipping performance of the material by the rolling unit is improved, and it becomes also possible to prevent the material from unnecessarily remaining in the storing unit at the end of a butch processing.

According to the eighth characterizing feature of the present invention, said rolling unit includes an upper and lower pair of rolls for forming the material into the sheet form and a rotary drive mechanism for rotatably driving at least one of the rolls; and said sheet forming device further comprises:

an operational mechanism mounting said pair of rolls in such a manner that the rolls are movable toward/away from each other and operating the pair of rolls to move them toward/closer to each other;

a clogging detecting means for detecting clogging of the material at the rolling unit and an emergency controlling means for issuing, upon detection of clogging by said clogging detecting means, a control command for operating the operational mechanism to increase the gap between the pair of rolls to a gap greater than a planned formed thickness of the sheet, a further control command for causing said rotary drive mechanism to effect forward rotary driving and a still another control command for rendering the pressing force of the pressing mechanism higher than said set pressure.

With the above-described sheet forming device according to the present invention, as the gap between the pair of rolls is increased to be greater than the planned formed thickness of the sheet, passage of the substance causing the clogging can be facilitated. In addition, as the material stored in the storing unit is pushed into between the pair of rolls while at least one of the pair of rolls is driven to rotate in the forward direction, any material remaining in the storing unit can be taken out speedily from between the pair of rolls before its viscosity changes. Hence, the trouble can be solved within a short period of time and without much trouble.

Further, especially if the material to be supplied to the storing unit has elasticity, a pressure distribution may develop within the storing unit. However, thanks to the provision of the pressing mechanism for pressing the material with a pre-set pressure (set pressure), the difference absorbing function for preventing sudden change in the inside pressure of the storing unit is provided for absorbing any difference between the receiving amount of the material from the supplying unit and the feeding amount of the material to the rolling unit, so that the sheet forming control can be effected relatively easily. In addition, even if the pressure of the storing unit is about to rise abnormally due to clogging between the rolls, the pressing mechanism provides the difference absorbing function to relieve the load applied to the rolls, so that damage or break of the rolling unit can be prevented. And, by setting the pressure of the pressing mechanism higher than the set pressure after the gap between the pair of rolls is increased, the material stored in the storing unit will be pushed into between the pair of rolls, so that the device can be protected and at the same time, the trouble can be solved speedily. Incidentally, as solution of such trouble can be automatically effected based on the control command from the emergency controlling means, it can be completed in even shorter time and speedily without much trouble.

According to the ninth characterizing feature of the present invention, said rolling unit includes an upper and lower pair of rolls for forming the material into the sheet form and a rotary drive mechanism for rotatably driving at least one of the rolls; and said sheet forming device further comprises:

an operational mechanism mounting said pair of rolls in such a manner that the rolls are movable toward/away from each other and operating the pair of rolls to move them toward/closer to each other;

a clogging detecting means for detecting clogging of the material at the rolling unit; and an emergency controlling means for issuing, upon detection of clogging by said clogging detecting means, a control command for operating the operational mechanism to increase the gap between the pair of rolls to a gap greater than a planned formed thickness of the sheet, a further control command for causing said rotary drive mechanism to effect forward rotary driving and a still another control command for causing the pressing mechanism to move up/down.

With the above-described sheet forming device according to the present invention, as the gap between the pair of rolls is increased to be greater than the planned formed thickness of the sheet, passage of the substance causing the clogging can be facilitated. In addition, as the material stored in the storing unit is pushed into between the pair of rolls while at least one of the pair of rolls is driven to rotate in the forward direction, any material remaining in the storing unit can be taken out speedily from between the pair of rolls before its viscosity changes. Hence, the trouble can be solved within a short period of time and without much trouble.

Further, especially if the material to be supplied to the storing unit has elasticity, a pressure distribution may develop within the storing unit. However, thanks to the provision of the pressing mechanism for pressing the material with a pre-set pressure (set pressure), the difference absorbing function for preventing sudden change in the inside pressure of the storing unit is provided for absorbing any difference between the receiving amount of the material from the supplying unit and the feeding amount of the material to the rolling unit, so that the sheet forming control can be effected relatively easily. In addition, even when the material has elasticity and a portion of this material tends to overflow to the outside from the top of the storing unit by pushing aside the pressing mechanism, since the pressing mechanism is moved up/down after the gap between the rolls has been increased to be greater than the planned formed thickness of the sheet, such material tending to overflow to the outside can also be pushed back to be effectively nipped between the pair of rolls. Hence, the trouble can be solved speedily and the device is effectively protected at the same time. Incidentally, as solution of such trouble can be automatically effected based on the control command from the emergency controlling means, it can be completed in even shorter time and speedily without much trouble.

Further, even when the supplying operation of the material by the supplying unit is stopped after the gap between the paired rolls has been increased, by setting the pressing force of the pressing mechanism to be higher than the normal set pressure or moving the pressing mechanism up/down in repetition, only the material in the storing unit can be taken out in a more efficient manner, so that the amount of defect material can be reduced.

BEST MODE OF EMBODYING THE INVENTION

Next, embodiments of the present invention will be described with reference to the accompanying drawings.

Figure 1:
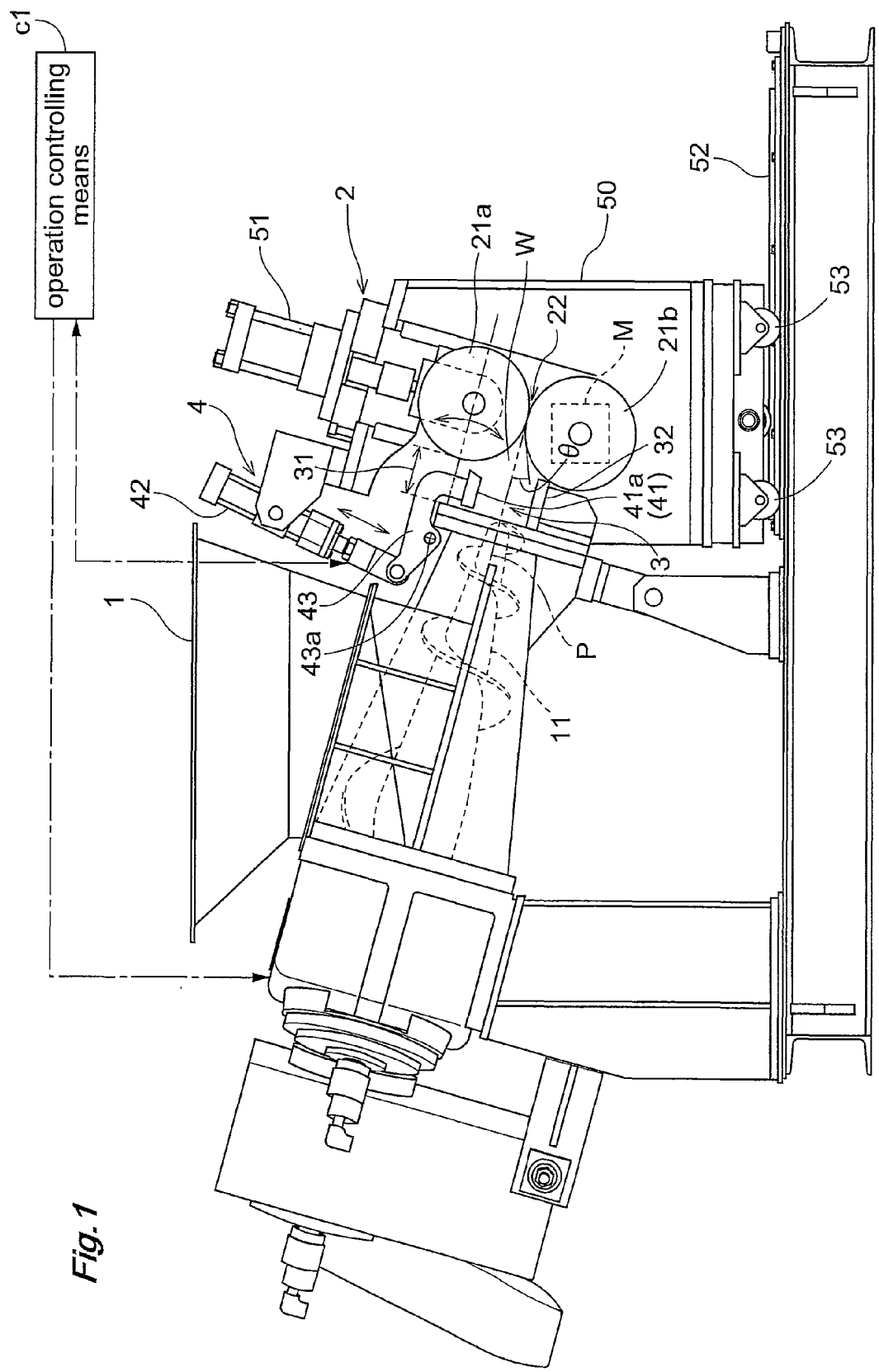
[FIG. 1] is an explanatory view showing a first embodiment of the sheet forming device relating to the present invention.

In the following discussion, first, the construction of the sheet forming device relating to the present invention will be described. Thereafter, trouble solutions of the inventive sheet forming device implemented by this sheet forming device and arrangements provided for the trouble solutions will be described. The present invention adopts a unique arrangement in the form of a pressing mechanism 4 to be provided in a storing unit 3. In this regard, FIG. 1 shows a mode of arrangement (First Embodiment) wherein the mechanism portion of this pressing mechanism 4 is provided on the roll supporting side. Whereas, FIGS. 2-6 show a further mode of arrangement (Second Embodiment) wherein the mechanism portion of this pressing mechanism 4 is provided on the supporting side of an extruder 11 of e.g. two-shaft tapered screw type which is provided downwardly of a supplying unit 1. Meanwhile, in this application, the extruder 11 will be described by way of an example of the two shaft tapered screw type. It is understood, however, that the invention is not limited thereto.

1 Construction of Sheet Forming Device
[First Embodiment]

FIG. 1 shows a first embodiment of the sheet forming device relating to the present invention.

This sheet forming device includes a supplying unit 1 for supplying (extruding) plastically deformable material W, a storing unit 3 for temporality storing an amount of material W supplied (extruded) from the supplying unit 1, and a rolling unit 2 for rolling the material W stored in the storing unit 3 into a sheet form.

Like the conventional sheet forming device, in this sheet forming device, the supplying unit 1 includes an extruder 11 and the rolling unit 2 includes two rolls 21a, 21b.

In this rolling unit 2, one of the two rolls 21a, 21b is rotatably driven by a rotary drive mechanism M such as a motor and the other roll operatively coupled with the one roll via a gear is driven to rotate in operative association therewith. Alternatively, both the two rolls 21a, 21b can be driven individually by independent rotary drive mechanisms (not shown) such as motors or the like. The rolls are mounted to a rolling unit body 50 in such a manner that the upper roll 21a is movable toward/away from the lower roll 21b, and there is provided an operational mechanism 51 for moving the rolls up/down by means of a hydraulic cylinder.

Further, in this rolling unit 2 having the pair of rolls 21a, 21b, its rolling unit body 50 is supported on rails 52 via support wheels 53. Hence, at the time of maintenance or in the event of occurrence of a trouble, the rolling unit 2 can be moved toward/away from the supplying unit 1.

Also, this sheet forming device is arranged such that the rolling unit 2 formed between the two rolls 21a, 21b of the rolling unit 2 is located in a plane P including a rotational axis of the extruder 11 of the supplying unit 1 and an angle θ formed between this plane P and the horizontal plane is set from 5 to 30 degrees (this angle is set as an angle lowering toward the rolling unit 2 and is set to 15 degrees in this particular embodiment).

In the storing unit 3 provided between the supplying unit 1 and the rolling unit 2, there is provided a pressing mechanism 4.

More particularly, this sheet forming device includes the pressing mechanism 4 configured to press the material W stored in the storing unit 3 with a predetermined pressure (a set pressure) from the upper side of the material W. The pressing mechanism 4 includes a pressing member 41 having a pressing face 41a. The area of this pressing face 41a is set to from 30 to 95% of the area of an upper opening portion 31 of the storing unit 3. In particular, when it is needed to prevent run-off of the material W, the area is set to from 85 to 95%. In this, the area of the upper opening portion 31 means the opening area as determined parallel with the plane P including the rotational axis of the extruder 11 of the supplying unit 1 and also in the plane (shown with two-dot line) including the rotational axis of the upper roll 21a of the pair of rolls 21a, 21b of the rolling unit 2.

In the instant embodiment, the size of the pressing face 41a of the pressing member 41 relative to the size of the upper opening portion 31 is set to about 70% in the feeding direction of the material W and to about 80% in the direction normal to the material W feeding direction (corresponding to the direction of the width of the sheet), respectively. As the result of these, the area of the pressing face 41a of the pressing member 41 is set to about 56% of the area of the upper opening portion 31 of the storing unit 3.

Especially, in the case of material having elasticity such as elastomer or plastic, pressure distribution may develop inside the storing unit 3. In order to restrict also pressure variation in the storing unit 3 and the rolling unit 2 which may occur in association with variation in the material supplying amount at the supplying unit 1, it is advantageous to provide the pressing mechanism 4 for pressing the material W from the upper side thereof with a predetermined fixed pressure. With this, the material W can be fed to the rolling unit 2 in a stable manner, with the application of the predetermined pressure to the material W stored in the storing unit 3 by this pressing mechanism 4. Therefore, it is possible to eliminate variation in the feeding amount of the material W to be fed to the rolling unit 2, so that high-quality sheet with shape regularity and high dimensional precision can be formed.

And, as the material W can be fed to the rolling unit 2 in a stable manner, with the application of the predetermined pressure to the material W stored in the storing unit 3 by this pressing mechanism 4, in the case of material which is difficult to be nipped at the rolling unit 2 due to the elasticity of the material W, the material can still be nipped effectively at the rolling unit 2 without slippage. For instance, even when the material supplying amount by the supplying unit 1 is too large relative to the material outputting amount by the rolling unit 2, as the pressing member 41 is moved upward to increase the capacity of the storing unit 3, excessive buildup in the inside pressure of the storing unit 3 can be restricted. When the material supplying amount to the storing unit 3 further increases, the pressing member 41 will be moved up to the opening end of the upper opening portion 31 of the storing unit 3, thus realizing an open bank condition with the top of the storing unit 3 being virtually open, so that the material W can be discharged to the outside of the storing unit 3. With this, it is possible to prevent occurrence of accident such as break of the device.

Further, with the setting of the area of the pressing face 41a of the pressing member 41 constituting the pressing mechanism 4 to 30 to 95% of the area of the upper opening portion 31, it is possible to provide the storing unit 3 with difference absorbing function of the open bank type with the top of the storing unit 3 being open, so that any sharp or sudden change in the inside pressure of the storing unit 3 can be absorbed. With this, it becomes possible to prevent damage to the device due to application of significant load to its constituting components such as the supplying unit 1 and the rolling unit 2.

Incidentally, the ratio of the pressing face 41a of the pressing member 41 relative to the area of the upper opening portion 31 of the storing unit 3, can be set freely within the above-described range of 30 to 95%, depending on e.g. the property of the material W, from the viewpoint of providing the storing unit 3 with the top-opened, open bank type difference absorbing function.

And, when e.g. the elasticity of the material W is extremely large, it is possible to employ a pressing member 41 having a pressing face 41a whose area is smaller than the area of the upper opening portion 31, in the range from 30 to 80%.

On the other hand, when the elasticity is not so large, it is preferred to employ a pressing member 41 having a pressing face 41a whose area is in the range from 70 to 95% or from 85 to 95% in the case of preventing overflowing of the material W, relative to the area of the upper opening portion 31.

The pressing mechanism 4, more particularly, includes the pressing member 41, an actuator 42 for applying the preset predetermined pressure (not particularly limited, but arrangement is made to freely set the pressure in the range from 0.2 to 5 MPa for instance) to the material W stored in the storing unit 3 from the pressing face 41a of the pressing member 41, such as a hydraulic cylinder, a pneumatic cylinder, an electric powered cylinder, a spring member, etc., and a link mechanism 43 (not particularly limited, but this can be a seesaw-type lever member having its pivotal shaft 43a disposed outside the storing unit 3 as shown in FIG. 1) for transmitting the force of this actuator 42 to the pressing member 41.

Incidentally, like Second Embodiment to be described later preferably, the actuator 42 and the link mechanism 43 of the pressing mechanism 4 are disposed on lateral side of the storing unit 3, avoiding the center thereof. With this, the space upwardly of the upper opening portion 31 of the storing unit 3 can be effectively utilized such that the inspection and cleaning of the storing unit 3 are made possible without disassembling the pressing member 41 or without moving the rolls 21a, 21b.

As described above, as the force of the actuator 42 is transmitted to the pressing member 41 via the link mechanism 43 (in particular, as shown in FIG. 1, the seesaw type lever member having its pivotal shaft 43a located on the outside of the storing unit 3), the pressing mechanism 4 can be easily disassembled at the position between the actuator 42 and the link mechanism 43 (between the link mechanism 43 and the pressing member 41), thereby to open wide the upper opening portion 31 of the storing 3. With this, the inspection and cleaning of the storing unit 3 can be carried out easily.

Further, when the link mechanism 43 is comprised of the seesaw like lever member having its pivotal shaft 43a disposed outside the storing unit 3 as shown in FIG. 1, even when the material supplying amount by the supplying unit 1 is excessively large relative to the material paying-out amount by the rolling unit 2, as the pressing member 41 is moved upward to the opening end of the upper opening portion 31 of the storing unit 3, there is automatically provided the open bank condition with the top of the storing unit 3 being virtually opened so that the material W can be discharged to the outside of the storing unit 3. As a result, it is possible to prevent an accident such as break of the device.

Meanwhile, since the pressing mechanism 4 is configured for pressing the material W stored in the storing unit 3 from the upper side thereof with a preset predetermined pressure, the position of the pressing face 41a of the pressing member 41 will vary within a predetermined range, in accordance with the amount of material W stored in the storing unit 3.

Then, there is provided an operation controlling means c1 for controlling the supplying mount of the material W by the supplying unit 1 and/or the paying-out amount of the material W by the rolling unit 2, in accordance with the position of the pressing face 41a of the pressing member 41, under the normal continuous operational condition. So, with by this operation controlling means c1, the supplying mount of the material W by the supplying unit 1 and/or the paying-out amount of the material W by the rolling unit 2 are/is controlled.

More particularly, when the position of the pressing face 41a of the pressing member 41 approaches its upper limit, the supplying amount of the material W by the supplying unit 1 is decreased and/or the paying-out amount of the material W by the rolling unit 2 is increased. Whereas, when the position approaches its lower limit, the supplying amount of the material W by the supplying unit 1 is increased and/or the paying-out amount of the material W by the rolling unit 2 is decreased. With this, the amount of the material W stored in the storing unit 3 is maintained to a predetermined amount, whereby high-quality sheet with shape regularity and high dimensional precision can be formed.

[Second Embodiment]

FIGS. 2 through 6 show a second embodiment of the sheet forming device relating to the present invention.

This sheet forming device, like First Embodiment, includes a supplying unit 1 for supplying rubber-like plastically deformable material W, a storing unit 3 for temporarily storing the material W supplied from the supplying unit 1, and a rolling unit 2 for rolling the material W stored in the storing unit 3.

And, in this sheet forming device too, there is provided a pressing mechanism 4 for pressing the material W stored in the storing unit 3 from its upper side with a present predetermined pressure. And, the area of the pressing face 41a of the pressing member 41 constituting the pressing mechanism 4 is set to be from 30 to 95% of the area of the upper opening portion 31 of the storing unit 3, or to from 85 to 95% in case it is needed to prevent overflowing of the material W.

Incidentally in this embodiment, like members to those in First Embodiment are denoted with like reference marks or numerals and description thereof will be omitted.

The pressing mechanism 4 includes the pressing member 41, an actuator 42 constituted of a hydraulic cylinder and configured for applying the preset predetermined pressure to the material W stored in the storing unit 3 from the pressing face 41a of the pressing member 41, and a link mechanism 43 for transmitting the force of this actuator 42 to the pressing member 41.

Figure 2:
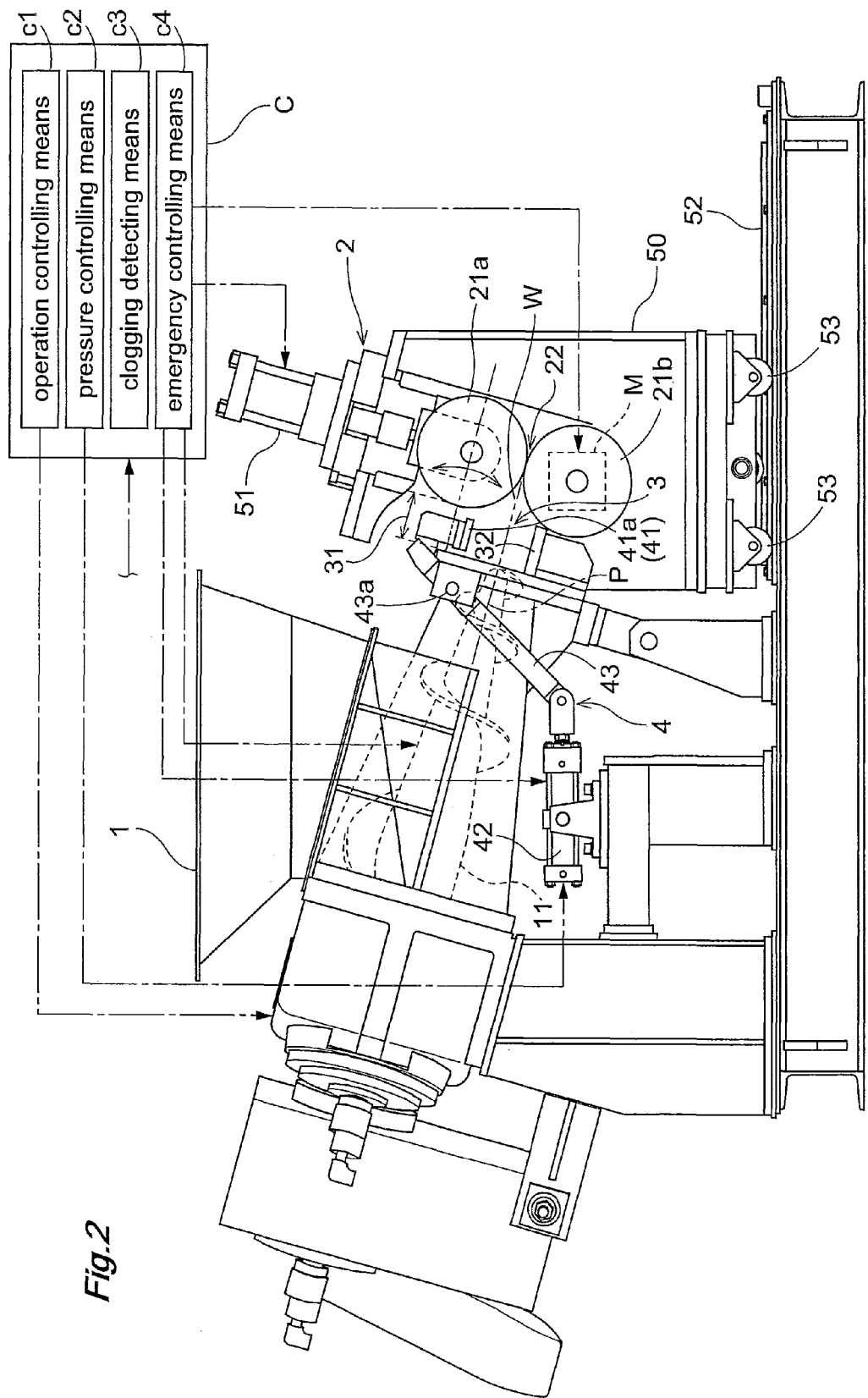
[FIG. 2] is an explanatory view showing a second embodiment of the sheet forming device relating to the present invention.
Figure 3:
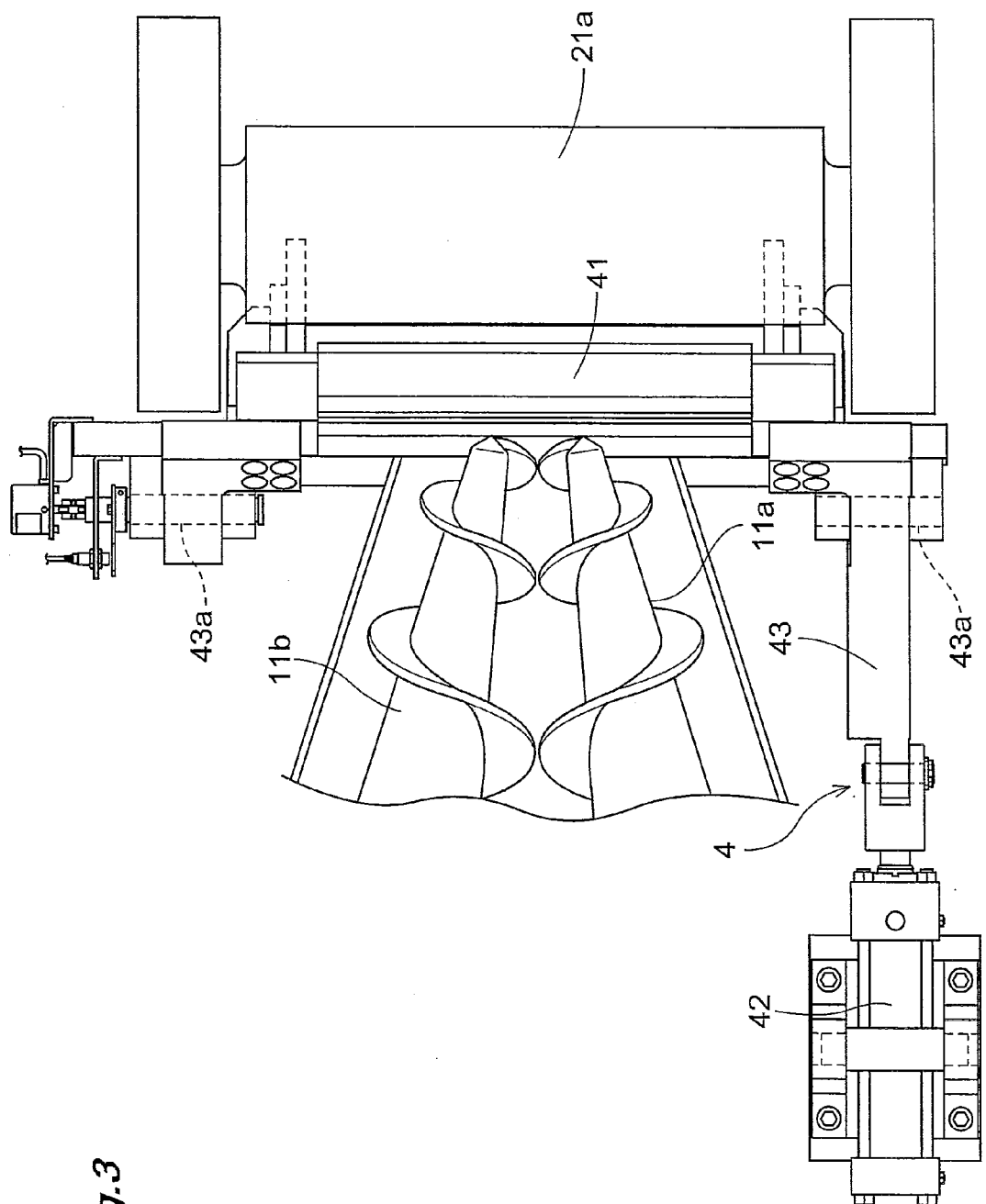
[FIG. 3] is a plane view showing a pressing mechanism of the sheet forming device.

In this embodiment, as shown in FIG. 2 and FIG. 3, the actuator 42 is disposed on the lower lateral side of the sheet forming device. With this, the pressing member 41 can be completely released from the storing unit 3 and the space upwardly of the upper opening portion 31 of the storing unit 3 can be effectively utilized such that the inspection and cleaning of the storing unit 3 are made possible without disassembling the pressing member 41 or without moving the rolls 21a, 21b.

Further, if the actuator 42 is disposed on the lower lateral side of the sheet forming device, it becomes possible to ensure a large arm ratio for the link mechanism 43, so that the propelling force generated by the actuator 42 can be reduced.

Moreover, by completely releasing the pressing member 41, it is possible to absorb sudden change in the inside pressure of the storing unit 3.

With this, for instance, even when the material supplying amount by the supplying unit 1 is excessively large relative to the material paying-out amount by the rolling unit 2, as the pressing member 41 is moved upward to increase the capacity of the storing unit 3, it is possible to restrict excessive rise in the inside pressure of the storing unit 3. When the material supplying amount to the storing unit 3 is further increased, as the pressing member 41 is moved upward to the open end of the upper opening portion 31 of the storing unit 3, there is realized an open bank condition with the top of the storing unit 3 being virtually opened, so that the material W can be discharged to the outside of the storing unit 3. With this, an accident such as break of the device can be prevented in even more reliable manner.

This sheet forming device includes an operation controlling means c1 for controlling the supplying mount of the material W by the supplying unit 1 and/or the paying-out amount of the material W by the rolling unit 2, in accordance with the position of the pressing face 41a of the pressing member 41 and a pressure controlling means c2 for maintaining the pressure of the actuator 42 of the pressing mechanism 4 at a low pressure where the rise response of the pressure member 41 is increased, prior to driving of the rolling unit 2 and for maintaining the pressure at a preset, fixed constant pressure after driving of the rolling unit 2.

The operation controlling means c1 is the same one provided in first embodiment. Namely, under normal continuous operation, the operation controlling means c1 controls the supplying amount of the material W by the supplying unit 1 and/or the paying-out amount of the material W by the rolling unit 2, in accordance with the pressing member 41 which is moved up/down depending on the amount of the material W.

On the other hand, the pressure controlling means c2 is configured such that by ensuring the rising of the pressure member 41 by the amount of material W supplied at the initial stage of the operation, the control of the supplying amount of the material W by the operation controlling means c1 is made reliable, thereby to prevent damage of the rolls 21a, 21b, etc. of the rolling unit 2 due to excessive supplying before driving.

Figure 4:
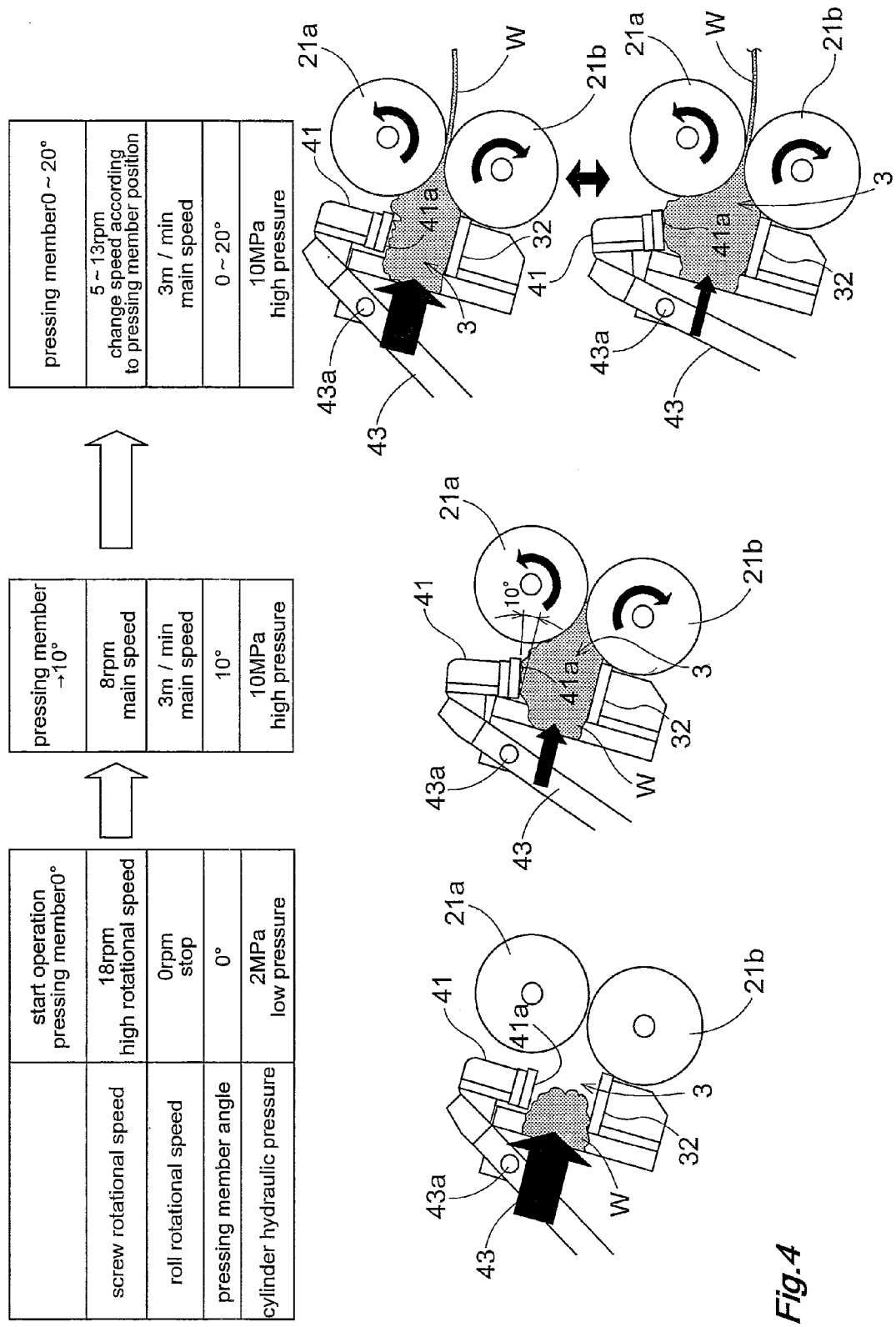
[FIG. 4] is an explanatory view illustrating movements of an operation controlling means and a pressure controlling means of the sheet forming device.

More particularly, as shown in FIG. 4, at the initial stage of operation when sufficient amount of material W has not yet been supplied to the storing unit 3, the rolls 21a, 21b are kept stopped while the storing unit 3 is filled with the material W to apply an internal pressure. Thereafter, when a sufficient amount of material W has been charged into the storing unit 3 and the pressing member 41 is moved up, the position of the pressing face 41a of the pressing member 41 can be detected based on change in the angle of the pressing member 41. And, when a change occurs in the angle of the pressing member 41 (e.g. change of 10 degrees in this embodiment, although the value is not particularly limited), this change is detected by means of e.g. a proximity switch, an encoder, or the like. Then, based on this detection signal, the operation of the rolls 21a, 21b is started, so that the sheet having great regularity can be extruded from the beginning. That is, the yield of the product can be improved.

After the start of operation of the rolls 21a, 21b, change in the angle of the pressing member 41 is detected by means of a proximity, an encoder, etc. Based on this detection signal, the operation controlling means c1 is operated so as to control the rotational speeds of screws 11a, 11b.

In this case, normally for the purpose of time saving, at the initial stage of operation, the screw rotational speed of the supplying unit 1 is rendered to a high speed (to about 2 to 5 times higher than the main speed at the normal constant operation, though the invention is not particularly limited thereto) and under the constant condition, the rotational speed of the screws 11a, 11b is switched to the main speed (low speed), thus providing rated supplying amount.

As described above, prior to driving of the rolling unit 2, the operation controlling means c1 sets the material supplying amount by the supplying unit 1 to the high supplying amount greater than the rated supplying amount. Then, when the position of the pressing face 41a of the pressing member 41 has risen, the driving of the rolling unit 2 is started and the material supplying amount of the supplying unit 1 is set to the rated supplying amount. With this control scheme, when the operation of the sheet forming device is to be started, as the material supplying amount by the supplying unit 1 is set to the high supplying amount with the driving of the rolling unit 2 stopped, the empty storing unit 3 can be charged with the material W in a speedy manner.

Further, completely charged condition of the storing unit 3 with the material M can be detected from the rise in the position of the pressing face 41a of the pressing member 41 and as the driving of the rolling unit 2 is started upon this detection, high-quality sheet can be extruded from the beginning.

On the other hand, when the pressing member 41 is being pressed with a high pressure, its rise response deteriorates.

Especially, when the pressing member 41 refuses to rise in spite of supplying of the material W, the operation controlling means c1 would not be operated, thus failing to switch over the screw rotational speed, which failure might result in break of the rolls 21a, 21b. In order to prevent this, until start of operation of the rolls 21a, 21b, there is provided a low pressure (to a pressure e.g. from 1/10 to 1/2 of that at the time of the normal operation, e.g. to 2 MPa, although the invention is not particularly limited thereto), whereby the movement of the pressing member 41 is made smoother and the control by the operation controlling means c1 is made more reliable.

Figure 5:
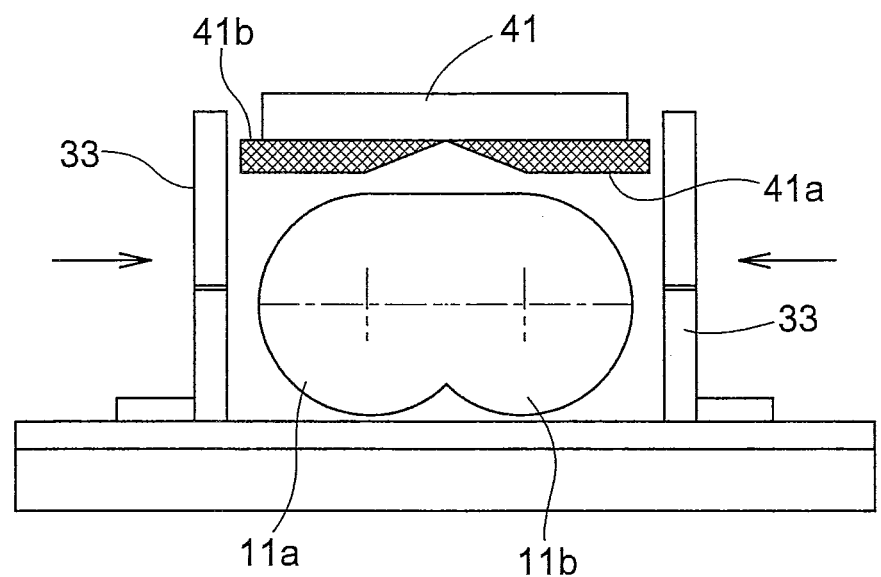
[FIG. 5] is a section view showing a storing unit of the sheet forming device.
Figure 5:
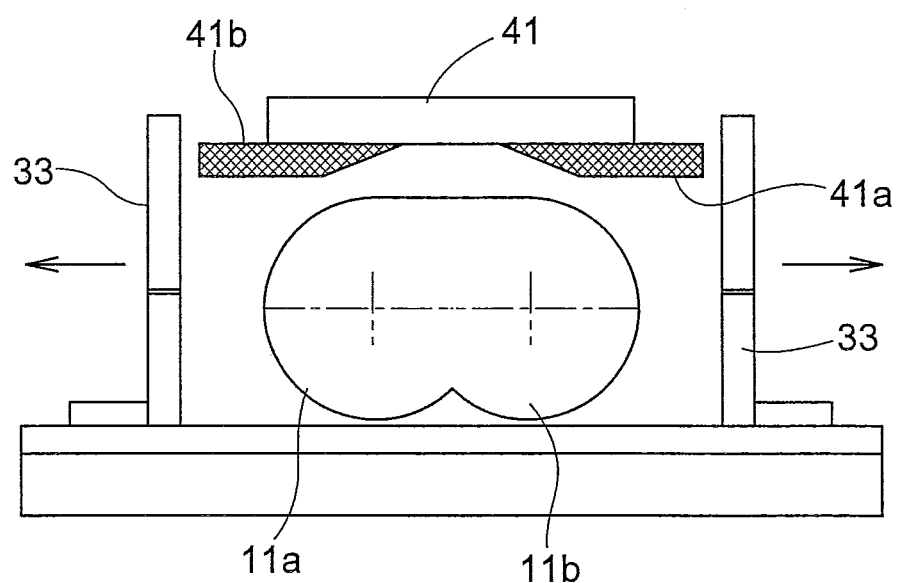

Further, as shown in FIG. 5, in this embodiment, the side wall 33 of the storing unit 3 is configured to be movable in the approaching/departing direction and also the pressing member 41 is configured to be expandable/contractible in the width direction.

Normally, in case the storing unit 3 is of the closed type ("closed bank" type), the width of the sheet is fixed, for the sake of ensuring sealing performance.

In contrast, in the present embodiment, the area of the pressing face 41a of the pressing member 41 is only a portion (30 to 95%) of the area of the upper opening portion of the storing unit 3, thus not requiring complete sealing. Accordingly, by changing the position of the side wall 33 of the storing unit 3 and/or the width size of the pressing face 41a of the pressing member 41, sheets of various width sizes can be extruded.

In this case, as a mechanism for varying the width size of the pressing face 41a of the pressing member 41, it is possible to attach a material pressing extension member 41b to the pressing member 41, with the extension member 41b being movable along the width direction.

With the above, the size of the pressing face 41a of the pressing member 41 along the feeding direction of the material W and the size thereof in the direction normal thereto (corresponding to the width direction of the sheet) can respectively be set to predetermined values (e.g. from 80 to 98%, though the invention is not particularly limited thereto).

Figure 6:
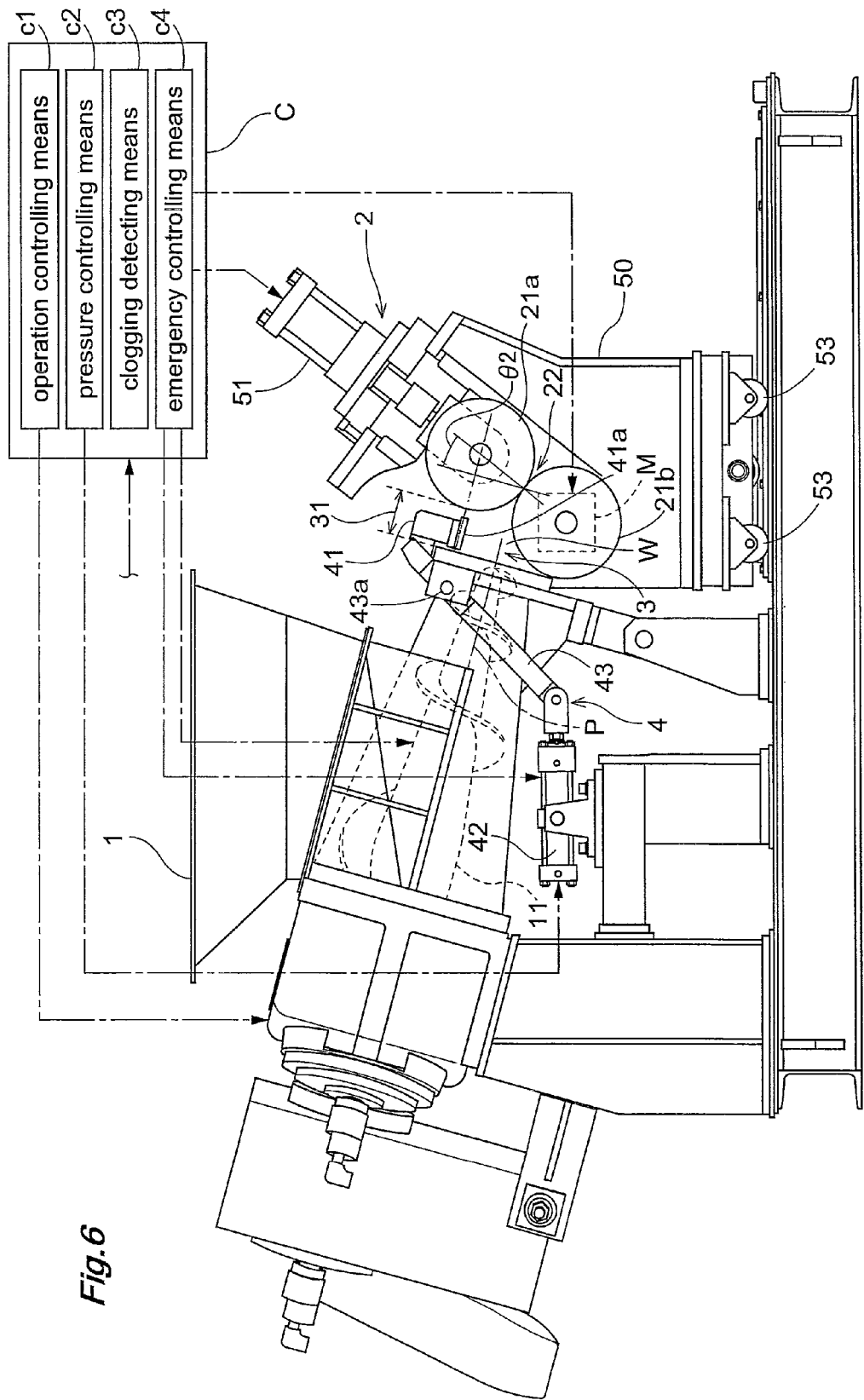
[FIG. 6] is an explanatory view showing a modified embodiment of the sheet forming device with omission of a receiving table.

Further, in a modified embodiment shown in FIG. 6, the receiving table 32 provided at the bottom of the storing unit 3 is omitted and the lower roll 21b of the two rolls 21a, 21b together constituting the rolling unit 2 is disposed adjacent the supplying unit 1 to be located downwardly of the pressing member 41 (the rotational axes of the two rolls 21a, 21b are arranged to be present in planes inclined by an angle θ 2 (25 degrees in the instant embodiment, though the invention is not particularly limited thereto) relative to the plane normal to the plane including the rotational axes of the screws 11a, 11b of the supplying unit 1. With this, the material W pressed by the pressing member 41 can be supported by the lower roll 21b of the two rolls 21a, 21b together constituting the rolling unit 2.

With the above-described arrangement, the material W in the storing unit 3 can be pressed by the pressing member 41 against the lower roll 21b, whereby it becomes possible to improve the nipping performance of the material W to the rolling unit 2 and also to prevent any material W from remaining in the storing unit 3 at the end of butch processing.

2. Methods of Solving Trouble in Sheet Forming Device and Solution for the Trouble Next, discussion will be made with reference to FIG. 2 and FIG. 6.

Operational Mechanism

As explained hereinbefore, the two rolls 21a, 21b provided in the rolling unit 2 are movable to freely vary the distance therebetween and this distance can be set to a desired distance by the operational mechanism 51.

Clogging Detecting Means

The sheet forming device relating to the present invention includes a clogging detecting means c3, which detects clogging of the material W in the rolling unit 2. More particularly, this clogging detecting means c3 is configured to be capable of detecting clogging by detecting rising of the pressing member 41 in excess of a predetermined height due to excessive material supplying by the supplying unit 1 or detecting an overflow amount of the material in excess of a predetermined amount from the upper opening portion 31.

Emergency Controlling Means

When the clogging detecting means c3 has detected clogging based on result of detection by the clogging detecting means c3, this emergency controlling means c4 outputs predetermined control commands to the operational mechanism 51, the rotary driving mechanism M, the extruder 11 of the supplying unit 1, the pressing mechanism 4 and so on.

Next, with reference to FIGS. 7-11, there will be explained methods of solving a trouble in the sheet forming device of the invention, based on control scheme of this emergency controlling means c4. There are disclosed five kinds of solution as follows as the trouble solving method of the sheet forming device of the invention. In these figures, the lower roll 21b is rotatably driven by the rotary driving mechanism M in the forward rotational direction, as the rotational direction being indicated by an arrow.

Incidentally, the above-described operation controlling means c1, the pressure controlling means c2, the clogging detecting means c3, and the emergency controlling means c4 are comprised of computers C such as microcomputers storing respective software for performing the predetermined function. And, based on the predetermined control commands issued by the emergency controlling means c4, the following trouble solving methods are executed by the respective means of the sheet forming device.

[Trouble Solving Methods]

In the sheet forming device described above, when there occurred kneading insufficiency in the kneading machine upstream the charging of the material W to the supplying unit 1 or the kneading temperature was inappropriate, insufficient plasticization may occur, which results in hard portions in the material W, causing excessive load to the rolling unit 2, slippage or failure of nipping. All of these can lead to failure of rolling of the material W by the rolling unit 2 and clogging of the material may result therefrom. In such cases, there will be implemented methods for solving the material clogging in the rolling unit 2 as follows.

First Method

Figure 7:
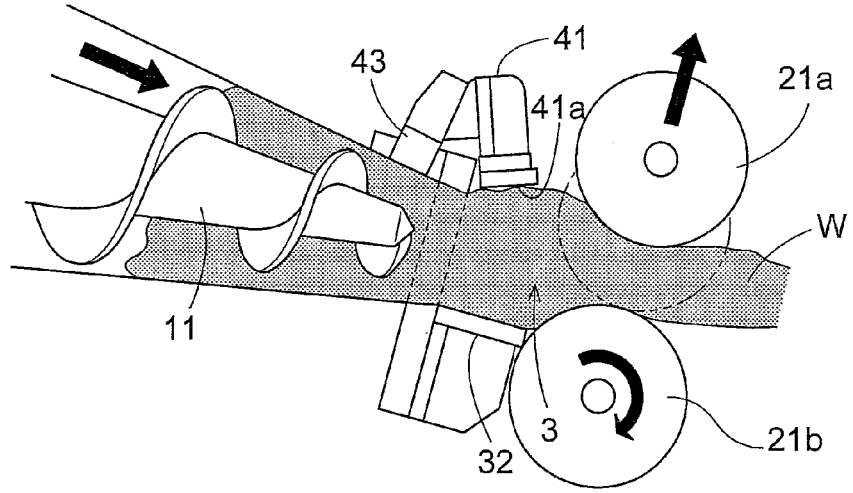
[FIG. 7] is a diagram showing functions of principal portions illustrating a first trouble solution.

In this first method, as shown in FIG. 2 and FIG. 7, the pair of rolls 21a, 21b are mounted in advance to the frame (rolling unit body 50) of the rolling unit 2 such that the rolls can move vertically toward/away from each other. Then, based on detection by the clogging detecting means c3 of clogging of the material W in the rolling unit 2, the operational mechanism 51 increases the gap between the pair of rolls 21a, 21b to be greater than the planned sheet forming thickness and activates the rotary driving mechanism M to rotatably drive at least one of the pair of rolls 21a, 21b in the forward rotational direction, while pressing the material W stored in the storing unit 3 into the gap between the pair of rolls 21a, 21a with a material pressing operation by the supplying unit 1.

In the above, the pressing force provided by the pressing mechanism 4 can be a set pressure for normal operation or can be free or zero-pressure.

As a result of the above, with the increase of the gap or distance between the pair of rolls 21a, 21b greater than the planned sheet forming thickness, passage of the material causing the clogging can be facilitated. Moreover, as the material W present in the storing unit 3 is pressed into the gap between the pair of rolls 21a, 21b while at least one of the pair of rolls 21a, 21b is driven to rotate in the forward rotational direction, the material remaining in the storing unit 3 can be removed speedily from the gap between the pair of rolls 21a, 21b to the outside before its viscosity changes. In addition, since the trouble can be solved only with the operation of increasing the gap between the pair of rolls 21a, 21b, without stopping the entire define, the trouble can be solved more speedily and the operation can be returned to the normal operation within a short period of time.

Second Method

Figure 8:
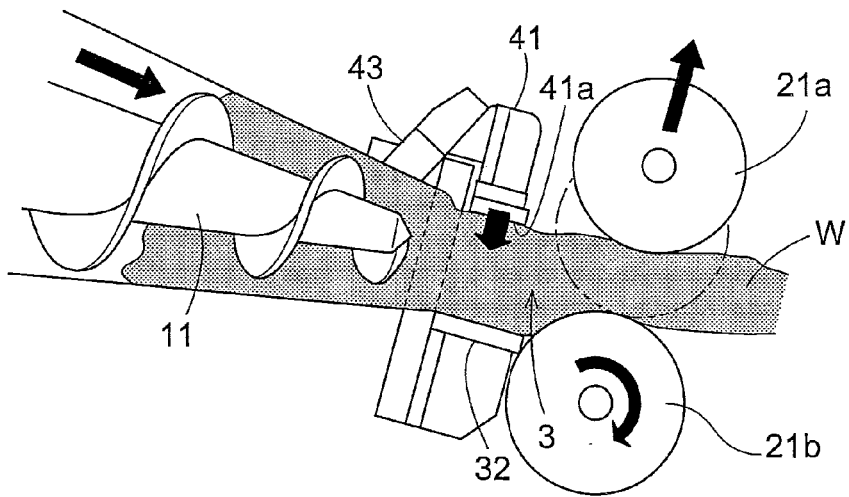
[FIG. 8] is a diagram showing functions of principal portions illustrating a second trouble solution.

In the second method, in addition to the first method described above, as shown in FIG. 2 and FIG. 8, after the operational mechanism 51 has increased the gap between the pair of rolls 21a, 21b to be greater than the planned sheet forming thickness, the pressing force of the pressing mechanism 4 is set to a pressure higher than the normal set pressure. In FIG. 8, the arrow shown at the leading end of the pressing mechanism 4 indicates that the pressing pressure has been set to a pressure higher than the normal set pressure.

As a result, with the setting of the pressure of the pressing mechanism 4 higher than the set pressure after increase of the gap between the pair of rolls 21a, 21b, the material W stored in the storing unit 3 is pushed into the gap between the rolls 21a, 21b. Hence, the trouble can be solved in speedy manner, with protection of the device being afforded at the same time.

Third Method

Figure 9:
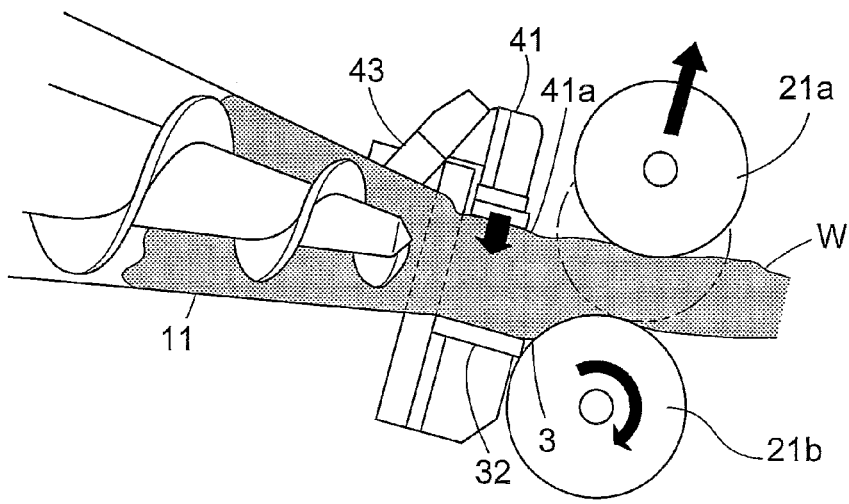
[FIG. 9] is a diagram showing functions of principal portions illustrating a third trouble solution.

In the third method, as shown in FIG. 2 and FIG. 9, after the operational mechanism 51 has increased the gap between the pair of rolls 21a, 21b to be greater than the planned sheet forming thickness, the supplying operation of the material W by the supplying unit 1 is stopped and the pressing force of the pressing mechanism 4 is set to a pressure higher than the normal set pressure. In FIG. 9 too, the arrow shown at the leading end of the pressing mechanism 4 indicates that the pressing pressure has been set to a pressure higher than the normal set pressure.

As a result, it is possible to remove only the material present inside the storing unit 3 with stopping of supply of material, so that the amount of defect article can be reduced.

Fourth Method

Figure 10:
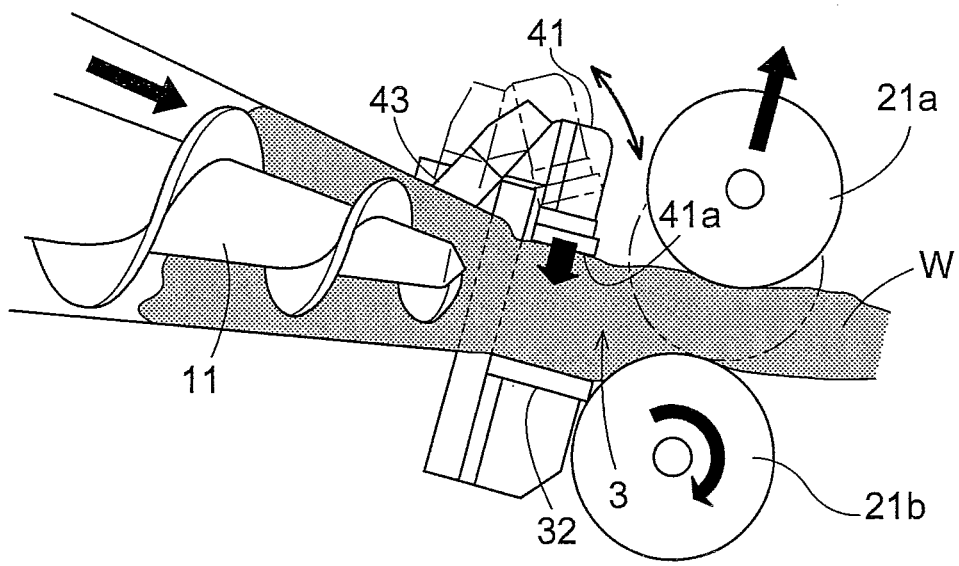
[FIG. 10] is a diagram showing functions of principal portions illustrating a fourth trouble solution.

In the fourth method, in addition to the first method described above, as shown in FIG. 2 and FIG. 10, after the operational mechanism 51 has increased the gap between the pair of rolls 21a, 21b to be greater than the planned sheet forming thickness, the pressing mechanism 4 is moved up/down in repetition. In FIG. 10, the arcuate double-ended arrow shown upwardly of the pressing mechanism 4 indicates such repeated up/down movement.

Incidentally, the maximum pressure the pressing mechanism 4 moved up/down repeatedly can be the normal set pressure or a higher pressure.

As a result, even when the material has elasticity and tends to overflow by pushing the pressing mechanism 4 aside from the upper portion of the storing unit 3, by moving the pressing mechanism 4 up/down in repetition after the increase of the gap between the pair of rolls 21a, 21b to be greater than the planned sheet forming thickness, such material too can be pushed into the gap between the pair of rolls 21a, 21b in an effective manner. In the meantime, this repetition of the up/down movement can be at least one or more times.

Fifth Method

Figure 11:
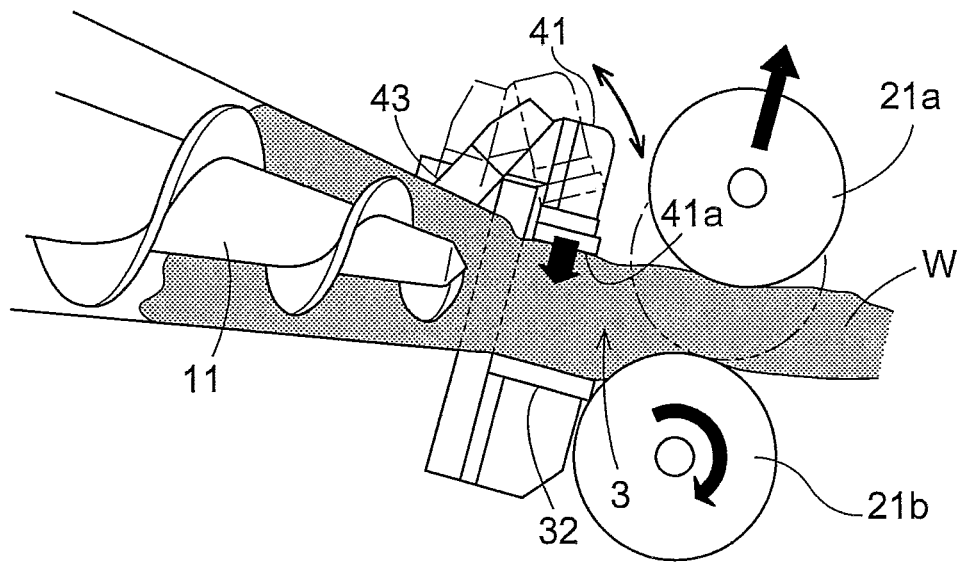
[FIG. 11] is a diagram showing functions of principal portions illustrating a fifth trouble solution.

In the fifth method, as shown in FIG. 2 and FIG. 11, after the operational mechanism 51 has increased the gap between the pair of rolls 21a, 21b to be greater than the planned sheet forming thickness with stopping of the supplying operation by the supplying unit 1, the pressing mechanism 4 is moved up/down in repetition. In FIG. 11 too, the arcuate double-ended arrow shown upwardly of the pressing mechanism 4 indicates such repeated up/down movement.

Incidentally, the maximum pressure the pressing mechanism 4 moved up/down repeatedly can be the normal set pressure or a higher pressure. And, this repetition of the up/down movement can be at least one or more times.

As a result, it is possible to remove only the material present inside the storing unit 3 with stopping of supply of material, so that the amount of defect article can be reduced.

Incidentally, while the above-described first through fifth methods can be implemented after the entire device is stopped upon detection of the material clogging in the storing unit 2, these trouble solving methods can be implemented continuously without stopping the entire device.

[Other Embodiment]

Further, the material to be supplied to the sheet forming device of the invention may be not only elastic material such as unvulcanized rubber, synthetic resin, or material containing one or more of these, but also a plastic material having no elasticity like inorganic clay. All these materials are generically referred to herein as "plastically deformable material".

Incidentally, as described above, although reference marks are provided for facilitating reference to the accompanying drawings, it is understood that the provision of these marks is not to limit the scope of the present invention to the arrangements shown in the drawings. And, it is a matter of course that the present invention can be embodied in a variety of modes within a range not departing from the essence of the present invention.

Industrial Applicability

The sheet forming device of the present invention is capable of forming high-quality sheets with greater shape regularity and high dimensional precision by eliminating variation in the feeding mount of plastically deformable material to the rolling unit and is capable also of absorbing any sudden change in the inside pressure of the storing unit. Therefore, the device can be advantageously employed as a sheet forming device for forming rubber or plastic having elasticity into the sheet form. Moreover, trouble due to material clogging can be solved easily.

The invention claimed is:

1. An open-bank sheet forming device having a supplying unit for extruding an amount of plastically deformable material, a storing unit having an upper opening portion for temporarily storing the material extruded from the supplying unit, and a rolling unit for rolling the material stored in the storing unit into a sheet form;

wherein said open-bank sheet forming device comprises a pressing mechanism for pressing the material stored in the storing unit from the upper side thereof with a preset pressure, said pressing mechanism including the pressing member, an actuator for applying the preset pressure to the material stored in the storing unit from the pressing face of the pressing member, and a link mechanism for transmitting a force of the actuator to the pressing member; and wherein a pressing member constituting the pressing mechanism has a pressing face whose area is set to from 30 to 95% of the area of the upper opening portion of the storing unit.

2. The open-bank sheet forming device according to claim 1, wherein there is provided an operation controlling means for controlling the supplying amount of the material by the supplying unit and/or the paying-out amount of the material by the rolling unit, depending on the position of the pressing face of the pressing member.

3. The open-bank sheet forming device according to claim 2, wherein said operation controlling means sets the material supplying amount by the supplying unit to a high supplying amount greater than a rated supplying amount before driving the rolling unit; and said operation controlling means starts driving of the rolling unit when the position of the pressing face of the pressing member has risen and sets the material supplying amount to the rated supplying amount.

4. The open-bank sheet forming device according to claim 1, wherein there is provided a pressure controlling means configured to maintain the pressure of the pressing mechanism to a low pressure which enhances the rising responsiveness of the pressing member before driving of the rolling unit and to maintain said pressure to a predetermined pressure after the driving of the rolling unit.

5. The open-bank sheet forming device according to claim 1, wherein a side wall of the storing unit is movable in the approaching/departing direction and the pressing member is expandable and contractible along the direction of the width thereof.

6. The open-bank sheet forming device according to claim 1, wherein the material pressed by the pressing member is supported by a lower roll of a pair of upper and lower rolls together constituting the rolling unit.

7. The open-bank sheet forming device according to claim 1, wherein said rolling unit includes an upper and lower pair of rolls for forming the material into the sheet form and a rotary drive mechanism for rotatably driving at least one of the rolls; and said sheet forming device further comprises:
  an operational mechanism mounting said pair of rolls in such a manner that the rolls are movable toward/away from each other and operating the pair of rolls to move them toward/closer to each other;
  a clogging detecting means for detecting clogging of the material at the rolling unit; and
  an emergency controlling means for issuing, upon detection of clogging by said clogging detecting means, a control command for operating the operational mechanism to increase the gap between the pair of rolls to a gap greater than a planned formed thickness of the sheet, a further control command for causing said rotary drive mechanism to effect forward rotary driving and a still another control command for rendering the pressing force of the pressing mechanism higher than said set pressure.

8. The open-bank sheet forming device according to claim 1, wherein said rolling unit includes an upper and lower pair of rolls for forming the material into the sheet form and a rotary drive mechanism for rotatably driving at least one of the rolls; and said sheet forming device further comprises:
  an operational mechanism mounting said pair of rolls in such a manner that the rolls are movable toward/away from each other and operating the pair of rolls to move them toward/closer to each other;
  a clogging detecting means for detecting clogging of the material at the rolling unit; and
  an emergency controlling means for issuing, upon detection of clogging by said clogging detecting means, a control command for operating the operational mechanism to increase the gap between the pair of rolls to a gap greater than a planned formed thickness of the sheet, a further control command for causing said rotary drive mechanism to effect forward rotary driving and a still another control command for causing the pressing mechanism to move up/down.

9. The open-bank sheet forming device according to claim 1, wherein the link mechanism comprises a lever member having a pivotal shaft thereof disposed outside the storing unit.

* * * * *